(12) United States Patent
Libin et al.

(10) Patent No.: US 12,159,651 B1
(45) Date of Patent: Dec. 3, 2024

(54) ASYNCHRONOUS VIDEO PRESENTATIONS WITH MULTI-VARIANT PRE-RECORDING, ALTERNATIVE FLOWS, AND IMMERSIVE FEATURES

(71) Applicant: mmhmm inc., Bentonville, AR (US)

(72) Inventors: Phil Libin, Bentonville, AR (US); Leonid Kitainik, San Jose, CA (US)

(73) Assignee: mmhmm inc., Bentonville, AR (US)

( * ) Notice: Subject to any disclaimer, the term of this patent is extended or adjusted under 35 U.S.C. 154(b) by 65 days.

(21) Appl. No.: 18/332,981

(22) Filed: Jun. 12, 2023

Related U.S. Application Data

(63) Continuation-in-part of application No. 17/665,776, filed on Feb. 7, 2022.

(60) Provisional application No. 63/146,732, filed on Feb. 8, 2021.

(51) Int. Cl.
| | |
|---|---|
| *G11B 27/34* | (2006.01) |
| *G06F 16/34* | (2019.01) |
| *G11B 27/036* | (2006.01) |
| *G11B 27/30* | (2006.01) |
| *H04L 12/18* | (2006.01) |

(52) U.S. Cl.
CPC ............ *G11B 27/34* (2013.01); *G06F 16/345* (2019.01); *G11B 27/036* (2013.01); *G11B 27/3036* (2013.01); *H04L 12/1831* (2013.01)

(58) Field of Classification Search
CPC ... G11B 27/34; G11B 27/036; G11B 27/3036; G06F 16/345; H04L 12/1831
See application file for complete search history.

(56) References Cited

U.S. PATENT DOCUMENTS

| | | | |
|---|---|---|---|
| 2014/0289654 A1* | 9/2014 | Basapur | G06F 16/447 |
| | | | 715/764 |
| 2022/0139376 A1* | 5/2022 | Buesser | H04L 67/306 |
| | | | 704/275 |

* cited by examiner

*Primary Examiner* — Mishawn N. Hunter
(74) *Attorney, Agent, or Firm* — Muirhead and Saturnelli, LLC

(57) ABSTRACT

Presenting a pre-recorded video presentation to an audience includes creating a plurality of pre-recorded alternative video portions that correspond to portions of the pre-recorded video presentation, each of the alternative video portions having a different level of granularity of subject level detail than any other alternative video portion, at least some of the portions including transition points to facilitate transitioning between alternative video portions of different granularity and measuring audience feedback while presenting the pre-recorded video presentation. In response to the audience feedback indicating at least one of: discomfort, confusion or questioning of content of a current portion of the pre-recorded video presentation by members of the audience, availability of at least one of the pre-recorded alternative video portions to replace the current portion of the pre-recorded video presentation is determined. The current portion of the pre-recorded video presentation may be stopped at a transition point.

20 Claims, 6 Drawing Sheets

ASYNCHRONOUS VIDEO PRESENTATIONS WITH MULTI-VARIANT PRE-RECORDING, ALTERNATIVE FLOWS, AND IMMERSIVE FEATURES

CROSS-REFERENCE TO RELATED APPLICATIONS

This application is a continuation-in-part of U.S. patent application Ser. No. 17/665,776, filed on Feb. 7, 2022, and entitled "HYBRID VIDEO PRESENTATIONS WITH MULTI-VARIANT PRE-RECORDING AND ALTERNATIVE FLOWS", which claims priority to U.S. Prov. App. No. 63/146,732, filed on Feb. 8, 2021, and entitled "HYBRID VIDEO PRESENTATIONS WITH MULTI-VARIANT PRE-RECORDING AND ALTERNATIVE FLOWS", both of which are incorporated herein by reference.

TECHNICAL FIELD

This application is directed to the field of audio-video communications and presentation of information, and more particularly to the field of asynchronously recorded video presentations with multi-variant pre-recording capabilities and associated alternative presentation flows and providing control and immersive features to viewers of the presentations.

BACKGROUND OF THE INVENTION

With the proliferation of remote and distributed work style owing to the rise of the geographically dispersed workforce, to the Covid-19 pandemic, to numerous advances in remote communications, and to many other factors, an asynchronous content created by employees, stored in enterprise video repositories, such as mmhmm TV, and viewed by co-workers, partners, customers, and other third parties, individually or in team settings, is augmenting in-person meetings and video conferencing and, on many occasions, can replace them.

Video content is quickly emerging as a dominant productivity, educational and entertainment medium for contemporary businesses and homes with business applications that include professional training, education, e-commerce, marketing, product development and support, business communications and presentations, hiring and onboarding, consulting, etc. According to market research, the size of global enterprise video market will grow from $33 billion in 2020 to $49 billion by 2030; the largest segment of that market is represented by marketing and sales business in Banking, Financial Services, and Insurance.

Usage estimates show that an average person spends about 100 minutes per day watching online video content. Product and service illustrations in the form of explainer videos exemplify one of the most popular content types; 95% of Internet users watch such videos. Additional polls show that 84% of the watchers make purchase decisions after learning product and service features from the explainer videos. It is also estimated that viewers can retain about 95% of the information found in a video content compared to just 10% information after consuming textual information.

Video sharing and streaming among employees, customers, and partners without a need for content authors to present their work in front of the viewers in live physical meetings or in live video conferences may offer significant time saving: the asynchronous content consumption metaphor increases flexibility of individual work, cuts down the difficulties of coordination and arrangement of meeting schedules, eliminates time zone barriers, and brings productivity boost to all participants of the video creation and consumption process. In this way, creation of the video content becomes increasingly separated from other the synchronous communications between the content author and the content viewers.

Public, group, and enterprise video repositories may store video content in multiple formats, provide hosting, authoring, editing, and sharing options, content categorization and tagging, authoring and usage analytics, social features, etc. Such repositories may include libraries of reusable video content for content creators and commenters. Notable examples of dedicated video repositories and platforms for public online video streaming include YouTube, Twitch, Aparat, IQiyi, Vimeo, Youku. General sites and social networks, such as Facebook, Tencent, Sina Weibo, Instagram, Twitter, Brightcove, DaCast, Dailymotion Cloud may offer video hosting among their features, while online video editing services Animoto, Clesh, Dailymotion, Blackbird, etc. have emerged as popular video hosting providers for businesses.

One of the mechanisms of collective video sharing, a Watch Party, has evolved independently from the formation of enterprise video content repositories. A watch party was initially defined as a social gathering for the purpose of watching a specific event or program on television. Advanced watch party applications, either associated with specific video content providers (Netflix, Hulu, Amazon Prime, Disney+GroupWatch, etc.) or provided by third-party aggregator apps for viewing multiple content sources and services (Scener, TeleParty, Kast), include a variety of features, such as initiation of a party by an organizer, switching between supported video sources (services, repositories), selection methods for the video to watch, playback control, different types of communication between the party participants, including text, voice, or video chat, and other features.

A new generation of watch party applications may use immersive technologies and software, such as the mmhmm application developed by mmhmm inc. Thus, each participant may join a watch party individually (for example, from the participant's home) and may be represented by a real-time image of the participant, captured by a front-facing camera on a mobile or a desktop device of the participant, segmented from the video stream and superimposed upon the meeting party environment (the watching space) common for all participants. The asynchronous content of a pre-recorded video presentation viewed by the participants of the watch party may also be immersive and may be replayed in a virtual channel located anywhere in the watching space.

SUMMARY OF THE INVENTION

Notwithstanding significant innovations in creation and use of pre-recorded, live and hybrid video presentations, the new metaphor for creation and usage of the video content presents many unanswered questions, such as adaptability of asynchronous videos. Dynamic measurement of the audience reaction and timely adaptation of presentations to the user engagement, pace of learning, potential confusions, and other aspects of comprehension and interaction by the content viewing audience. Current asynchronous presentations lack flexibility and instant adaptation to different levels of comprehension and to potential confusion of a major portion of the audience consuming a pre-recorded video content.

Accordingly, it is important to develop techniques and systems for asynchronous video presentations with adaptation capabilities that may adequately customize presentation flow in response to audience reactions and allow certain levels of interaction with the audience.

According to the system described herein, presenting a pre-recorded video presentation to an audience includes creating a plurality of pre-recorded alternative video portions that correspond to portions of the pre-recorded video presentation, each of the alternative video portions having a different level of granularity of subject level detail than any other alternative video portion, at least some of the portions including transition points to facilitate transitioning between alternative video portions of different granularity and measuring audience feedback while presenting the pre-recorded video presentation. In response to the audience feedback indicating at least one of: discomfort, confusion or questioning of content of a current portion of the pre-recorded video presentation by members of the audience, availability of at least one of the pre-recorded alternative video portions to replace the current portion of the pre-recorded video presentation is determined. In response to the at least one of the pre-recorded alternative video portions that correspond to the current portion of the pre-recorded video presentation being available, the current portion of the pre-recorded video presentation is replaced with the at least one of the pre-recorded alternative video portions by stopping the current portion of the pre-recorded video presentation and starting the at least one of the pre-recorded alternative video portions. The current portion of the pre-recorded video presentation may be stopped at a transition point. Presenting a pre-recorded video presentation to an audience may also include, in response to the at least one of the pre-recorded alternative video portions not being available, prompting the members of the audience to select one of: stopping the pre-recorded video presentation, immersing at least one of the members of the audience in the pre-recorded video presentation, or continuing with the current portion of the pre-recorded video presentation. At least one of the members of the audience may be immersed in the pre-recorded video presentation to provide a detailed explanation of the current portion of the pre-recorded video presentation. The at least one of the members of the audience that is immersed in the pre-recorded video presentation may be recorded along with the current portion of the pre-recorded video presentation. Presenting a pre-recorded video presentation to an audience may also include replacing a different one of the alternative video portions of the pre-recorded video presentation with an alternative video portion having less subject level detail to free up time for the at least one of the pre-recorded alternative video portions. Following the at least one of the pre-recorded alternative video portions, the pre-recorded video presentation may resume at a location of the pre-recorded video presentation immediately following the at least one of the pre-recorded alternative video portions. Resuming the pre-recorded video presentation may depend upon an amount of time remaining in the pre-recorded video presentation and/or an amount of time used for the at least one of the pre-recorded alternative video portions. The transition points may be defined using time stamps. Measuring audience feedback may include capturing verbal and non-verbal cues shown by members of the audience. The verbal and non-verbal cues may include gestures, facial expressions, gaze direction and trajectory, questions asked via chat, forms, applications, or other mechanisms, chat exchange between members of the audience, voice replicas, and/or physiological characteristics captured by wearable devices and sensors of the members of the audience. Measuring audience feedback may include using facial recognition, gesture recognition, voice recognition, speech recognition, eye tracking, natural language processing, and/or machine learning. At least some of the video portions may show slides of the presentation. The different subject level detail may include a basic explanation of the at least one of the slides and a condensed summary of the at least one of the slides provided by bullet point text. The different subject level detail may include an explanation of tables, diagrams, graphs, and/or accompanying text. The pre-recorded alternative video portions may be provided in a repository and replacing the current portion of the pre-recorded video presentation with the at least one of the pre-recorded alternative video portions may include searching the repository for the alternative video portion. At least some members of the audience may be watch party members that are immersed in a watch party space that is separate from a presentation space used for the pre-recorded video presentation and the presentation space may be overlaid upon the watch party space. At least one of the watch party members may also be immersed in the presentation space and may provide a detailed explanation of a slide in the presentation space. The at least one of the watch party members may be recorded and added to a repository for future access.

According further to the system described herein, a non-transitory computer readable medium contains software that presents a pre-recorded video presentation to an audience using a plurality of pre-recorded alternative video portions that correspond to portions of the pre-recorded video presentation, each of the alternative video portions having a different level of granularity of subject level detail than any other alternative video portion, at least some of the portions including transition points to facilitate transitioning between alternative video portions of different granularity. The software includes executable code that measures audience feedback while presenting the pre-recorded video presentation, executable code that determines availability of at least one of the pre-recorded alternative video portions to replace the current portion of the pre-recorded video presentation in response to the audience feedback indicating at least one of: discomfort, confusion or questioning of content of a current portion of the pre-recorded video presentation by members of the audience, and executable code that replaces the current portion of the pre-recorded video presentation with the at least one of the pre-recorded alternative video portions by stopping the current portion of the pre-recorded video presentation and starting the at least one of the pre-recorded alternative video portions in response to the at least one of the pre-recorded alternative video portions that correspond to the current portion of the pre-recorded video presentation being available. In response to the audience feedback indicating at least one of: discomfort, confusion or questioning of content of a current portion of the pre-recorded video presentation by members of the audience, availability of at least one of the pre-recorded alternative video portions to replace the current portion of the pre-recorded video presentation is determined. In response to the at least one of the pre-recorded alternative video portions that correspond to the current portion of the pre-recorded video presentation being available, the current portion of the pre-recorded video presentation is replaced with the at least one of the pre-recorded alternative video portions by stopping the current portion of the pre-recorded video presentation and starting the at least one of the pre-recorded alternative video portions. The current portion of the pre-recorded video presentation may be stopped at a transition point. The software may also include executable code that prompts the members of the audience to select one of: stopping the pre-recorded video presentation, immersing at least one of the members of the audience in the pre-recorded video presentation, or continuing with the current portion of the pre-recorded video presentation in response to the at least one of the pre-recorded alternative video portions not being available. At least one of the members of the audience may be immersed in the pre-recorded video presentation to provide a detailed explanation of the current portion of the pre-recorded video presentation. The at least one of the members of the audience that is immersed in the pre-recorded video presentation may be recorded along with the current portion of the pre-recorded video presentation. The software may also include executable code that replaces a different one of the alternative video portions of the pre-recorded video presentation with an alternative video portion having less subject level detail to free up time for the at least one of the pre-recorded alternative video portions. Following the at least one of the pre-recorded alternative video portions, the pre-recorded video presentation may resume at a location of the pre-recorded video presentation immediately following the at least one of the pre-recorded alternative video portions. Resuming the pre-recorded video presentation may depend upon an amount of time remaining in the pre-recorded video presentation and/or an amount of time used for the at least one of the pre-recorded alternative video portions. The transition points may be defined using time stamps. Measuring audience feedback may include capturing verbal and non-verbal cues shown by members of the audience. The verbal and non-verbal cues may include gestures, facial expressions, gaze direction and trajectory, questions asked via chat, forms, applications, or other mechanisms, chat exchange between members of the audience, voice replicas, and/or physiological characteristics captured by wearable devices and sensors of the members of the audience. Measuring audience feedback may include using facial recognition, gesture recognition, voice recognition, speech recognition, eye tracking, natural language processing, and/or machine learning. At least some of the video portions may show slides of the presentation. The different subject level detail may include a basic explanation of the at least one of the slides and a condensed summary of the at least one of the slides provided by bullet point text. The different subject level detail may include an explanation of tables, diagrams, graphs, and/or accompanying text. The pre-recorded alternative video portions may be provided in a repository and replacing the current portion of the pre-recorded video presentation with the at least one of the pre-recorded alternative video portions may include searching the repository for the alternative video portion. At least some members of the audience may be watch party members that are immersed in a watch party space that is separate from a presentation space used for the pre-recorded video presentation and the presentation space may be overlaid upon the watch party space. At least one of the watch party members may also be immersed in the presentation space and may provide a detailed explanation of a slide in the presentation space. The at least one of the watch party members may be recorded and added to a repository for future access.

The proposed system offers asynchronously recorded video presentations constructed from alternative pre-recorded segments for each slide (or other portion of presentation material), where the alternative segments may reflect different levels of granularity (amount of subject level detail), based on the preliminary analysis of the content of each slide and of the hierarchy of presentation objects created for each slide. The system may keep a repository of alternative presentation segments for each slide with varying levels of granularity and may dynamically alter the sequence of segments and the presentation flow in response to reactions and feedback from the viewing audience; the feedback is constantly assessed by a technology stack that may include capturing and aggregation of verbal and non-verbal cues by different audience members. When user feedback indicates comprehension issues, questions or other problems, the system may alter the presentation flow on the fly, choosing an optimal alternative presentation segment from the repository for a given slide, paying attention to time limitations and to transition points between segments. The system may also give the audience a choice between continuing the unaltered presentation, immersing an audience member who may replace the original presenter and explain or comment on portion of a video content (when the system cannot find an adequate pre-recorded segment in the repository), or discontinuing the presentation.

Various aspects of system functioning are explained as follows.

1. Slide analysis. The system analyzes the content of each slide in the presentation identifying presentation objects of each slide, such as text in different formats and structures (boxes, tables, etc.), diagrams and charts, graphs, images, highlights, connectors, references, and other object types.

Subsequently, the system may automatically or semi-automatically (assisted by a presenter and/or analyst) build a hierarchy of presentation objects and presentation segments, created by the presenter and semi-ordered by a place of the presentation objects in the level of granularity of the slide presentation. For example, a text box with bullet points in large fonts, positioned near the top of a slide, may belong to a first or a second level of granularity, while a graph, illustrating one of the bullet points in the above-mentioned text box and positioned on the same slide, may be several granularity levels below the text. The content of a presentation segment may range from the non-granular, basic explanation that may include the slide subject, the place of the slide subject in an overall presentation, and a connection of the slide subject with other slides in the presentation, to a detailed explanation of slide objects involving multiple levels of granularity.

There may be different presentation segments with the same level of granularity, explaining different presentation objects at different layers of object hierarchy: for example, one presentation segment may focus on a diagram associated with one of the key bullet points on a slide, while another segment with the same granularity level may skip the diagram and underscore a graph, illustrating another bullet point or portion of the text on a slide.

2. Pre-recording alternative slide presentations. For each slide, presenter(s) may pre-record one or several alternative video segments with different levels of granularity. For example:
 a. The first level of granularity may reflect a pre-recorded general/basic slide presentation loosely mentioning presentation objects of the slide without any specifics.
 b. The second level of granularity may expand the basic presentation to add details on a bullet point text that is occupying a prominent position on the slide.
 c. The third level of granularity may include two segments expanding on the second level of granularity, where one of the segments is explaining a diagram associated with one of the bullet points and another segment is focusing on a graph associated with another bullet point.

d. Finally, the fourth level of granularity could explain all or most of the presentation objects, including all objects listed in items a.-c.

In the above example, presenter(s) may record five alternative presentation segments, one each for the first, second and fourth granularity levels (items a., b., d.) and two for the third granularity level in item c.

Special attention is paid to transition points-timestamps and additional, small, pre-recorded portions of each segment, allowing smooth sequencing of presentation segments. A transition point is a fraction of a pre-recorded segment where substitution of a less granular segment for a more granular segment is logically consistent with both segments and would generally go unnoticed by audience members. It could be, for example, a verbal pause in the presentation or it could include a special introductory sentence, such as "Let me explain this chart" where the next, more granular segment is explaining the chart that has not been detailed in the preceding, less granular segment. The system described herein keeps track of transition points of segments and the specific alternative segments that can be inserted at specific transition points.

Transitions may exist not only in the direction of higher granularity but also in the opposite direction. For example, if a particular generic (less granular) segment has been presented to 60% of the length of the generic segment, a transition point has been reached, and the system has determined that a more granular segment is to be presented at the transition point, then, upon the completion of the second, more granular segment, the presentation may return back to the less granular segment and continue its replay for the remaining 40% of the duration of the less granular segment.

3. Repository of presentation segments. Pre-recorded presentations segments for slide decks of all presentations may be stored in a searchable system repository, which may include, for every slide and pre-recorded segment, descriptions of presentation objects, hierarchies of the presentation objects, granularity levels, transition points, and other parameters of each segment, along with usage data and analytics, showing, for example, statistics and conditions of transfers between segments of presentation slides.

4. Initial presentation flow. Depending on presentation goals, audience size and characteristics, training course, timing, and other factors, presenter(s) or other personnel may choose an initial presentation flow, designating a unique presentation segment for each slide of an appropriate slide deck.

5. Viewing presentations; watch party. Pre-recorded presentations may be published for viewing by relevant audiences, individually or in groups, including watch parties, explained elsewhere herein. In a watch party environment, an immersive pre-recorded video presentation is replayed within another immersive virtual space, a watch party space. Accordingly, the immersive presentation space and the watch party space may be overlaid, at least partially, on each other to form a combined immersive video space.

The replayed pre-recorded content may possess multiple interactive features, providing watch party members (participants, viewers. users) with the ability to interact with the asynchronous video content. Thus, live participants who are already immersed into the watch party environment may be further immersed into the pre-recorded video presentation, replacing the original presenter (a hybrid immersion), and conducting a portion of the presentation.

6. Assessing audience feedback. The system may use various mechanisms to measure audience feedback through capturing non-verbal and verbal cues by the audience members, such as gestures, facial expressions, gaze direction and trajectory; questions asked via chat, forms, applications, or other mechanisms; chat exchange between users; voice replicas; physiological characteristics captured by wearable devices and sensors of the users, etc. The system may then employ a technology stack, including facial, gesture, voice and speech recognition, eye tracking, natural language processing, machine learning, and other technologies used to feed the captured characteristics of user feedback into a sentiment recognition system that may identify and aggregate audience reactions to the presentation.

7. Altering pre-recorded presentation. If the audience reaction shows a significant (or quickly growing) degree of discomfort, confusion and questioning of the presentation content by the audience, the system may attempt to alter the presentation by using the repository of pre-recorded presentation segments. Specifically, the system may assess the main sources of a negative feedback and search the repository of presentation segments for an alternative segment that best resolves the confusion through additional explanations with higher granularity levels, as explained elsewhere herein.

If a candidate replacement segment is found, the system may estimate the overall presentation schedule, the time remaining, and other factors, such as a multi-part presentation set, where there exists an additional flexibility of moving a portion of the presentation to a next part. Additionally, the system may assess the possibility of replacing one or more granular presentation segments, initially chosen for the subsequent slides, with more basic segments to free time for the current replacement segment. Time permitting, the system may replace the current segment with the chosen replacement segment, using timestamps and transitions to make the replacement look seamless for the audience. Upon the completion of the altered segment, the system may return to the initial presentation flow.

8. Immersive users. If, during a presentation replay for a group of users, such as a watch party, the audience feedback indicates difficulties with comprehension, questions or other issues, and an adequate alternative presentation segment to alleviate the issues has not been found, the system may present several choices to the audience, such as continuing the presentation without altering its flow or ending the presentation. A potentially more valuable option is available when the asynchronous video content has the double immersion capability explained above, i.e., if an audience member may be immersed into the presentation space and replace the original presenter (who may be hidden and whose speech may be muted) to comment on the presentation content and provide explanations to improve the presentability and assuage lack of comprehension or other problems caused by the audience feedback. Such immersive presenters are creating ad hoc alternative presentation segments that may be recorded, stored in the repository and subsequently user for other audiences.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for creating and viewing asynchronous pre-recorded video presentations, altered on the fly, and constructed from alternative pre-recorded segments for each slide (or other presentation unit), where the alternative segments may reflect different levels of granularity.

Figure 1:
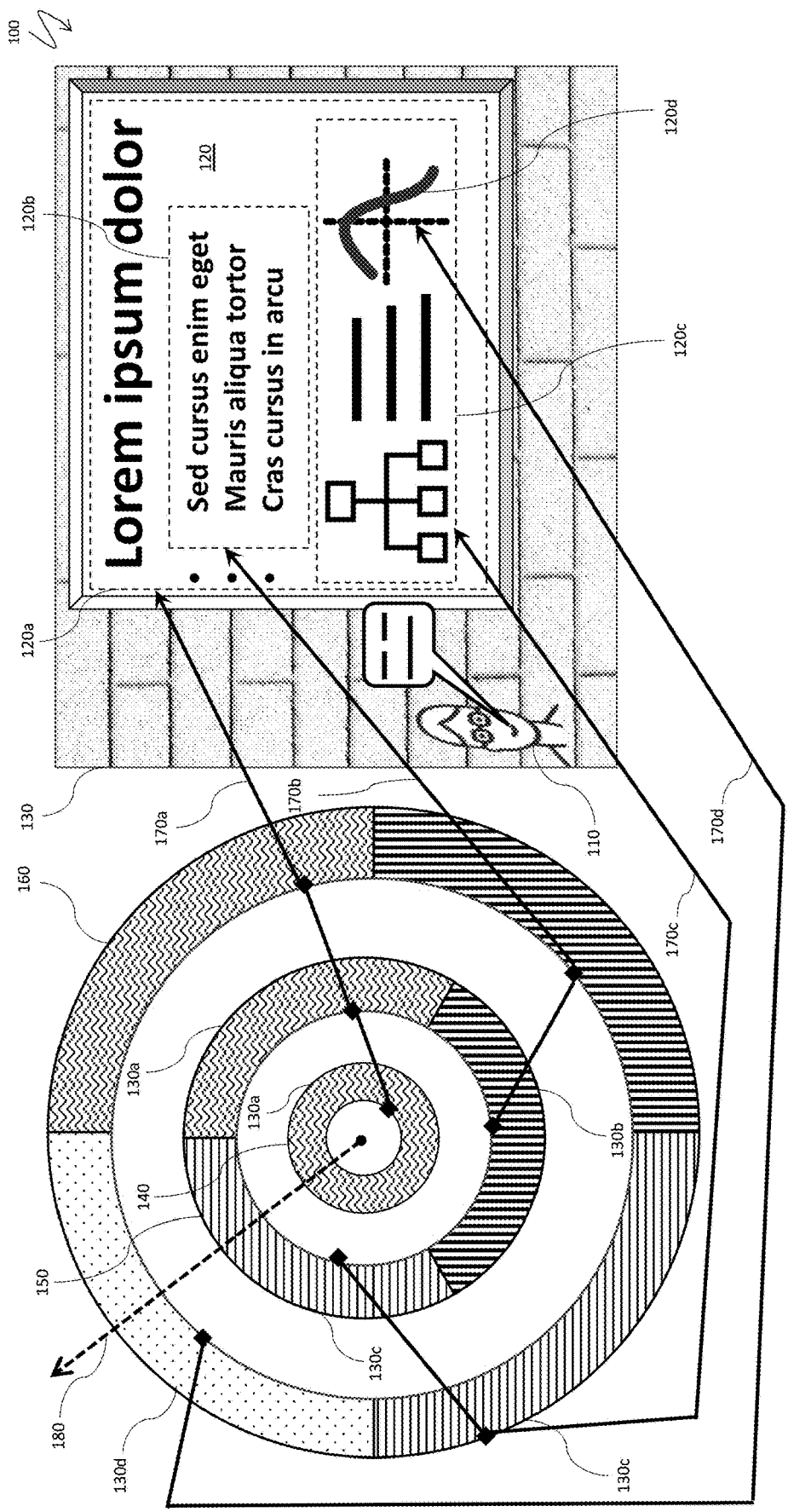
FIG. 1 is a schematic illustration of designing presentation options by levels of granularity, according to an embodiment of the system described herein.

FIG. 1 is a schematic illustration 100 of designing presentation options by levels of granularity. A presenter 110 asynchronously records a multi-variant presentation of a slide 120 displayed on a physical or virtual background 130. The content of the slide 120 is analyzed by the system, as explained elsewhere herein. Subsequently, the content of the slide 120 is split into four presentation objects: a general basic characterization of the slide content 120*a*; a bullet point text 120*b*, containing a condensed summary of the slide 120; diagrams, graphs and accompanying texts 120*c*; and a detailed graph 120*d* (a portion of the diagrams, graphs and accompanying texts 120*c*). The presentation objects 120*a-d* reflect granularity levels of content of the slide 120 and suggest different explanation options.

A set of three alternative presentation segments 140, 150, 160 of the content of the slide 120 reflect increasing levels of granularity. The segment 140 includes only a first level of granularity. The segment 140 is a video recording 130*a* of a talk of the presenter 110 about the presentation object 120*a*. The segment 150 is a more detailed presentation and includes the talk of the presenter 110 about three levels of granularity: the recording 130*a*, a talk 130*b* about the bullet point text 120*b* (the second granularity level), and a presentation 130*c* of the third presentation object 120*c* (and the third granularity level). The segment 160 is a most comprehensive presentation adding an elaborate explanation 130*d* of the graph 120*d* by the presenter 110. Segmented arrows 170*a-d* show connections between portions of the talk of the presenter 110 in each presentation segment and the corresponding presentation objects and granularity levels on the slide 120. An arrow 180 indicates a growth of comprehensiveness (level of details, level of granularity) of the pre-recorded segments 140, 150, 160. Note that the structure of presentation segments may be less linear and concentric than the example in FIG. 1. Thus, for example, a presenter may focus on explaining one of the bullet points and a related chart, making only brief mentions of other presentation options and even omitting part of the other presentation options.

Figure 2:
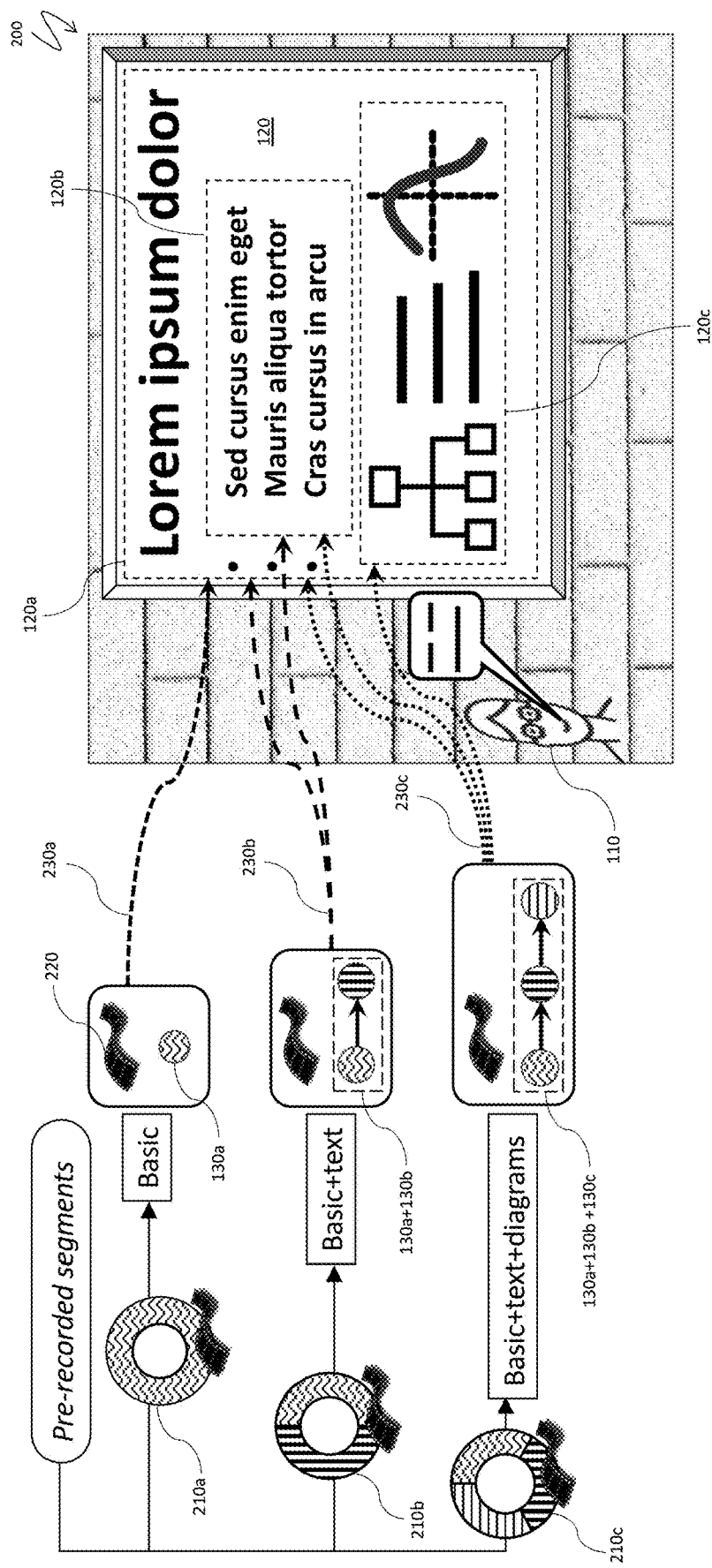
FIG. 2 is a schematic illustration of pre-recording presentation segments for multiple levels of granularity, according to an embodiment of the system described herein.

FIG. 2 is a schematic illustration 200 of pre-recording presentation segments for multiple levels of granularity. The presenter 110, the slide 120 and the three presentation objects 120*a*-120*c*, reflecting the corresponding granularity levels of content of the slide 120, correspond to items in FIG. 1. Based on an analysis of the slide content and the overall presentation plan, the system recommends, and the presenter pre-records three segments (slightly different compared with FIG. 1):

A segment 210*a* is a recording 220 of a basic presenter talk corresponding to the video recording 130*a* about the basic characterization of the slide content 120*a* (the presentation segment 140 in FIG. 1).

A segment 210*b* is a recording of the two consequent explanations of the presenter 110, where the first explanation, corresponding to the video recording 130*a*, is about the basic characterization of the slide content 120*a*, immediately followed by the second explanation, corresponding to the talk 130*b* about the bullet point text 120*b*.

A segment 210*c* adds to the previous segment 210*b* a recording of the presentation 130*c* of the third presentation object 120*c* (corresponding to the second segment 150 in FIG. 1). Arrows 230*a-c* show connections of each presentation segment to the presentation objects explained in that segment.

All pre-recorded segments may be saved in the repository (see section 3 of the Summary; the repository is not shown in FIG. 2)

Figure 3:
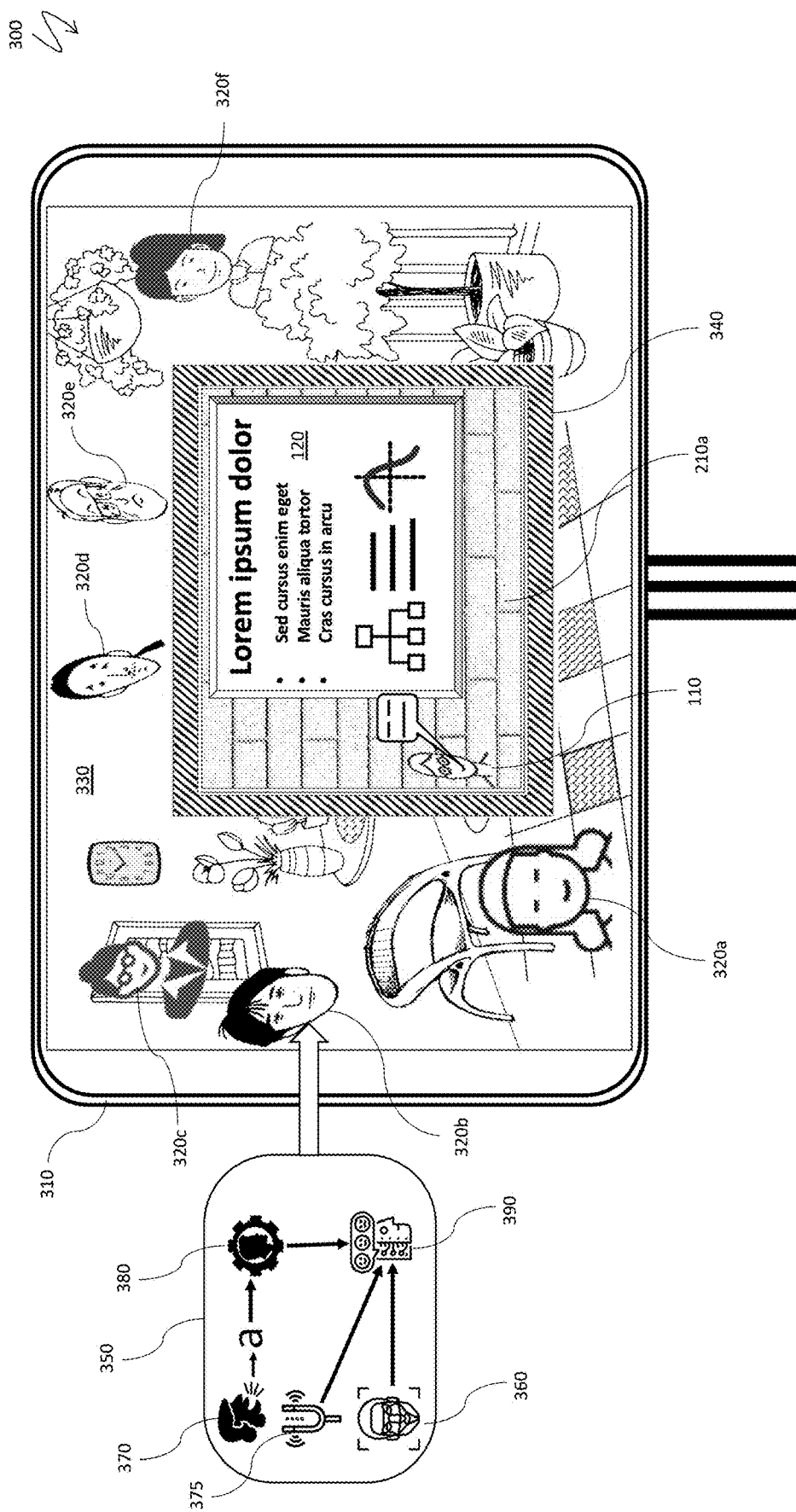
FIG. 3 is a schematic illustration of a watch party for an asynchronous video presentation and of registering user feedback via a technology stack, according to an embodiment of the system described herein.

FIG. 3 is a schematic illustration 300 of a watch party for an asynchronous video presentation and of registering user feedback via the technology stack. A watch party 310 is joined by participants (users) 320*a*-320*f* from possibly different individual locations and computers (some of the locations may be shared); user images may be captured by front cameras of the computers of the participants 320*a*-320*f* and immersed into a watch party environment 330 chosen by one or more watch party organizers.

The participants 320*a*-320*f* watch the segment 210*a* of an asynchronous video presentation pre-recorded by the presenter 110 who explains the slide 120 (see FIGS. 1, 2 for details). A presentation space, visualized as a pane 340, is overlaid upon the watch party environment 330.

The system uses a technology stack 350 to assess reactions of the participants 320*a*-320*f*, non-verbal, and verbal feedback to the asynchronous video presentation. The technology stack 350 may include facial emotion recognition 360, speech recognition 370, voice intonation and emotion recognition 375, natural language processing for recognized and typed text (for example, chat messages between the participants 320*a*-320*f*, and sentiment recognition 390 that may aggregate information and results collected by other technologies into a final assessment of user reaction and feedback.

Figure 4:
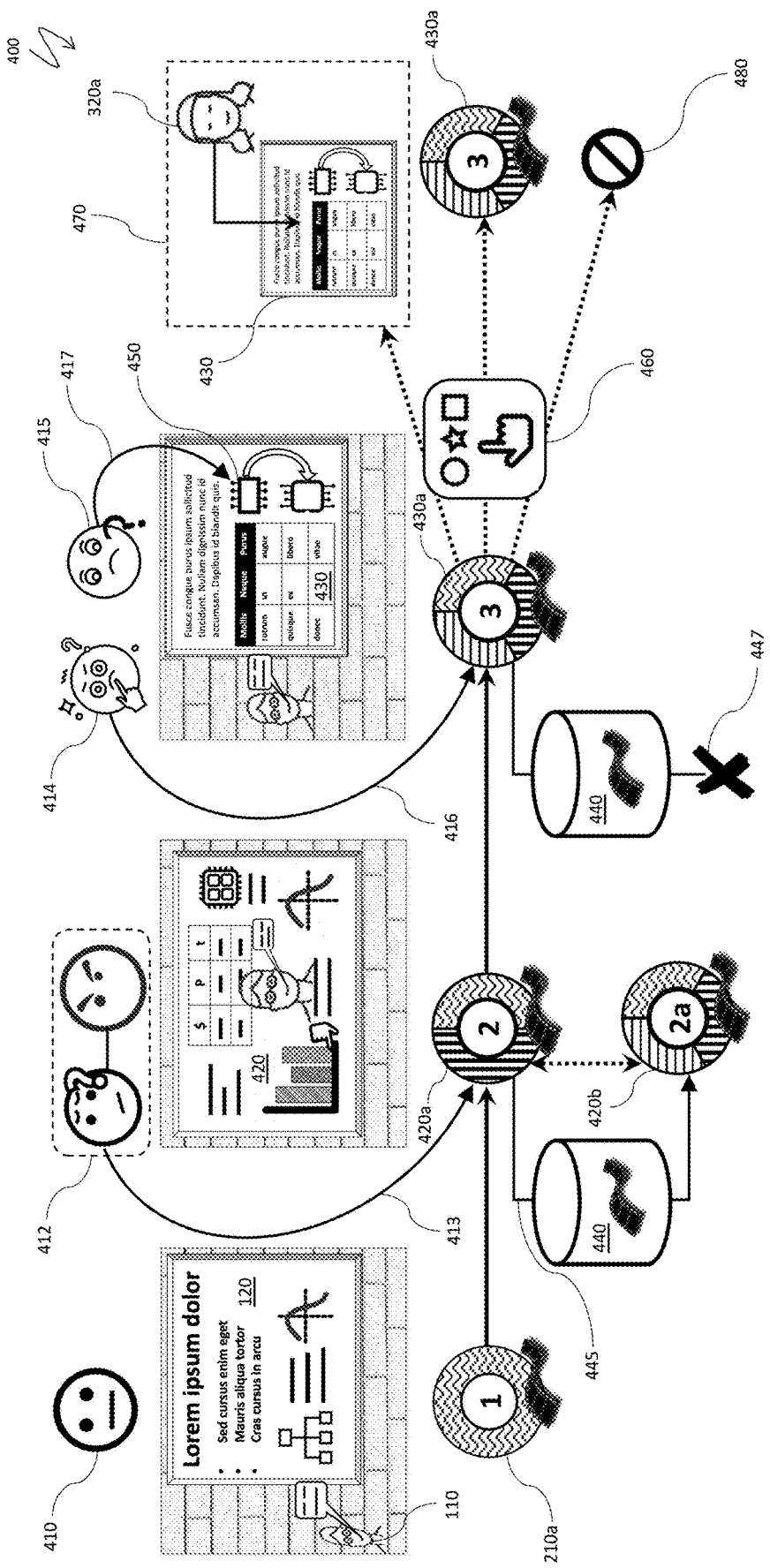
FIG. 4 is a schematic illustration of managing an asynchronous presentation flow for watch party members, according to an embodiment of the system described herein.

FIG. 4 is a schematic illustration 400 of an asynchronous presentation flow for the participants 320*a*-320*f* of the watch party 310 shown in FIG. 3. The presenter 110 has pre-recorded multiple presentation segments for some slides in the presentation and created an initial presentation flow, a plan for the whole asynchronous presentation, which includes a default pre-recorded segment for each slide (see section 4 of the Summary). The system has a capability to manage the presentation flow by altering pre-recorded segments and engage immersive users when necessary and possible (as explained in the section 5 of the Summary).

Viewing of the asynchronous presentation starts with replaying the slide 120, explained by the presenter 110, employing the pre-recorded segment 210a (see FIGS. 1, 2 and the accompanying text for more info). User reactions and feedback are assessed, as explained elsewhere herein (see section 6 of the Summary). An overall audience reaction to the first pre-recorded segment may be positive or at least neutral, as illustrated by an emoticon 410, so the system proceeds from the slide 120 to a next slide 420, replaying a default segment 420a from an initial presentation flow. User feedback to the default segment 420a may not be as positive as to the segment 210a: users 412 appear confused and angered. This causes the system to react (as shown by an arrow 413) and look for a replacement for the segment 420a. Depending on the timing, progression of the video presentation and additional non-verbal and verbal cues of the user feedback, the system examines a repository 440 of pre-recorded segments to find an alternative pre-recorded segment 420b, as shown by an arrow 445. The alternative pre-recorded segment 420b is found (see Summary for the additional information on replacement conditions and consequences) and replaces the default segment 420a. Prior to switching to the segment 420b, the system may replay the segment 420a to a transition point, seamlessly connecting the contents of the two segment 420a, 420b so that a more detailed explanation from the alternative pre-recorded segment 420b naturally continues the presenter talk from the segment 420a. In FIG. 4, the rest of the asynchronous presentation for the slide 420 goes smoothly from the standpoint of audience feedback.

A third slide 430 is presented through an asynchronous presentation segment 430a with a relatively detailed agenda (three levels of granularity) in the initial presentation flow, explaining (i) the general information about the slide 430 and the text on the top of the slide, (ii) the table on the left bottom side of the slide; and (iii) the diagram 450 on the right bottom side of the slide. Two users 414, 415 have non-neutral reactions to the segment 430a: the user 414 shows general confusion with the presentation segment (an arrow 416), while the user 415 asks a question (or shows lack of understanding) about a specific presentation object 450 (an arrow 417). The system looks for a resolution in the segment repository 440 but does not find a satisfactory alternative segment, as illustrated by a cancellation item 447.

Subsequently, the system presents three choices 460 to the users:
An option 470: invoking the participant 320a, who has become an immersive user, for additional explanations of the slide 430;
Continue presentation with the current segment 430a (non-neutral reactions of users 415, 417 may be recorded and reported to the asynchronous presenter and/or discussed after the completion of the asynchronous presentation);
An option 480: discontinue/stop the presentation.

Figure 5:
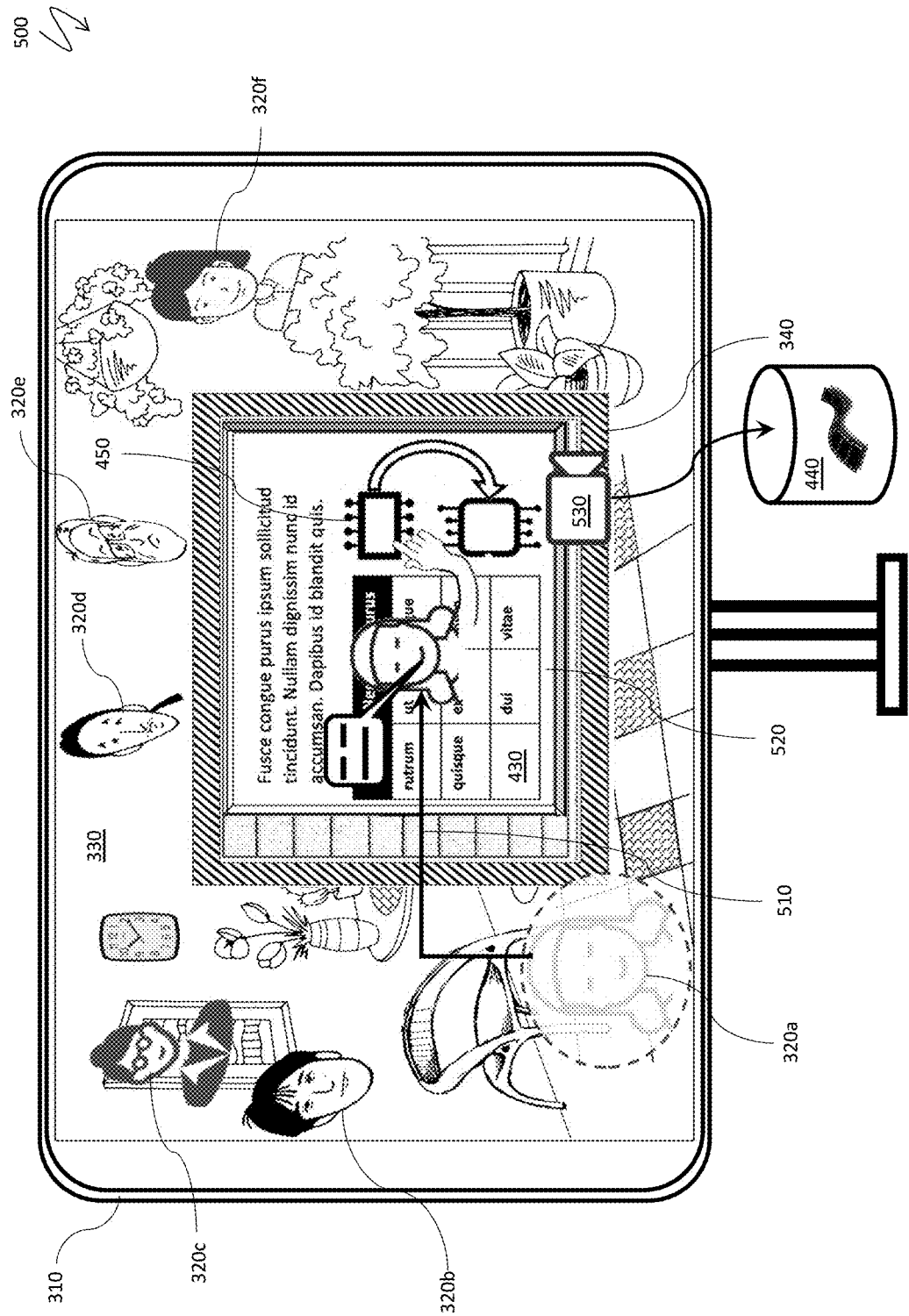
FIG. 5 is a schematic illustration of an immersive watch party member replacing an asynchronous presenter to comment on a portion of a video presentation, according to an embodiment of the system described herein.

FIG. 5 is a schematic illustration 500 of an immersive watch party member replacing an asynchronous presenter to comment on a portion of the video presentation. FIG. 5 provides more detail in connection with the option 470 shown in FIG. 4 for the situation when an adequate original asynchronously pre-recorded segment cannot be found in the searchable segment repository 440 to resolve negative user reactions to presentation of the segment 430a (items 470 and 430 are not shown in FIG. 5).

Like in FIG. 3, the watch party 310 is conducted in the watch party environment 330 for viewing an asynchronous video content (presentation). The user 320a volunteers (or is chosen) to comment on and explain the diagram 450, part of the slide 430 that caused questions from the users 414, 415 in FIG. 4 and did not find an adequate explanatory fragment in the fragment repository 440. The user 320a is transported from the watch party environment 330 into the presentation space 340, as indicated by an angled arrow 510. Subsequently, the user 320a replaces the original asynchronous presenter (hidden from the presentation space in FIG. 5) and explains the diagram 450, thus creating a new presentation fragment 520 (which continues the unfinished original fragment 430a in FIG. 4). The fragment 520 may be recorded by the presentation recording component 530 and may be stored in the repository 440 for potential use in future asynchronous presentations.

Figure 6:
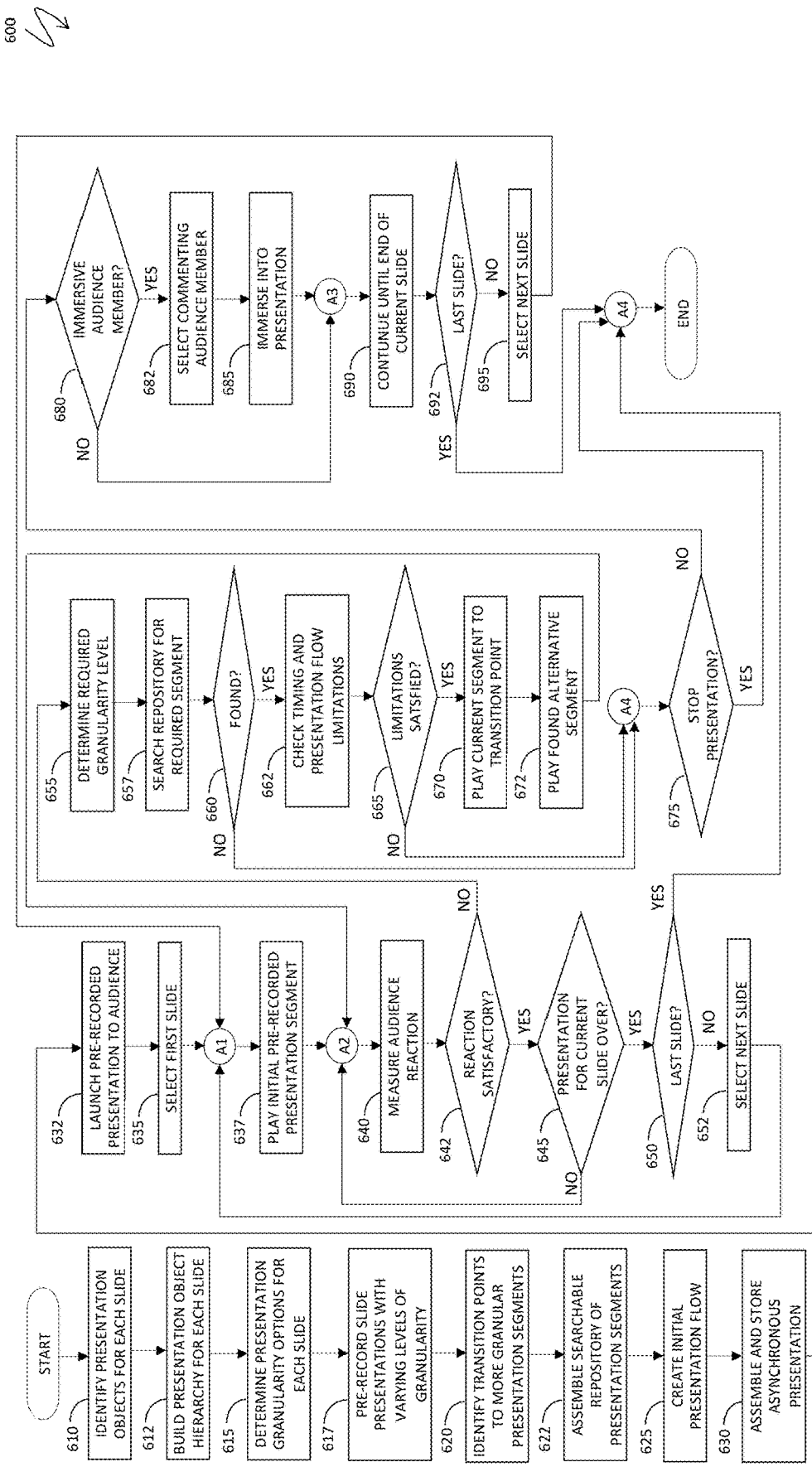
FIG. 6 is a system flow diagram illustrating system functioning in connection with analyzing slides, pre-recording alternative presentation segments, and managing an asynchronous presentation flow for watch party members, according to an embodiment of the system described herein.

Referring to FIG. 6, a system flow diagram 600 illustrates system functioning in connection with analyzing slides, pre-recording alternative presentation segments, and managing an asynchronous presentation flow for watch party members. Processing begins at a step 610, where the system identifies presentation objects for each slide (possibly assisted by the presenter or other personnel). After the step 610, processing proceeds to a step 612, where a hierarchy of presentation objects is built for each slide, as explained elsewhere herein (see, in particular, FIG. 1 and the accompanying text). After the step 612, processing proceeds to a step 615, where presentation granularity options are determined for each slide (see FIG. 1 and the accompanying text). After the step 615, processing proceeds to a step 617, where the presenter asynchronously pre-records slide presentations with varying levels of granularity, as explained, for example, in FIG. 2 and the accompanying text. After the step 617, processing proceeds to a step 620, where the system and/or the presenter identify transition points between the less granular and the more granular presentation segments. The transition points allow smooth replacements of a less granular to a more granular segment, and vice versa. After the step 620, processing proceeds to a step 622, where the system assembles a searchable repository of slide-by-slide presentation segments with varying levels of granularity (see item 440 in FIG. 4). After the step 622, processing proceeds to a step 625, where the presenter creates the initial presentation flow and associates a predefined presentation segment with each slide. After the step 625, processing proceeds to a step 630, where the system assembles and stores an asynchronous presentation under control of one or more presenters.

After the step 630, processing proceeds to a first runtime step 632, where the pre-recorded presentation is launched to the audience, such as the watch party. After the step 632, processing proceeds to a step 635, where the first slide is selected. After the step 635, processing proceeds to a step 637, where the initial (predefined) pre-recorded presentation segment is replayed. After the step 637, processing proceeds to a step 640, where the system measures audience comfort/engagement level, reaction, and feedback, as explained elsewhere herein (see, for example, section 5 of the Summary and FIG. 3 with the accompanying text). After the step 640, processing proceeds to a test step 642, where it is determined whether the audience reaction and feedback are satisfactory for continuing the presentation with the current presentation segment. If so, processing proceeds to a test step 645, where it is determined whether the presentation of the current slide is complete. If the presentation of the current slide is not complete, processing proceeds back to the step 640, which may be independently reached from the step 637; otherwise, processing proceeds to a test step 650, where it is determined whether the current slide is the last slide in the asynchronous presentation. If so, processing is complete; otherwise, processing proceeds to a step 652, where the next slide is selected. After the step 652, processing proceeds to the step 637, which may be independently reached from the step 635.

If it is determined at the test step 642 that the audience reaction and feedback are not satisfactory for continuing the presentation with the current segment, processing proceeds to a step 655, where the system determines a required granularity level of the continued presentation to select in order to improve audience feedback, as explained elsewhere herein (see, for example, section 7 of the Summary and FIG. 4 with the accompanying text). After the step 655, processing proceeds to a step 657, where the system searches the repository of pre-recorded presentation segments for the required segment, that is, for a candidate for replacing the current segment. After the step 657, processing proceeds to a test step 660, where it is determined whether the required segment was found. If so, processing proceeds to a step 662, where the system checks the timing and presentation flow limitations to determine whether the found segment may be inserted into the modified presentation flow. After the step 662, processing proceeds to a test step 665, where it is determined whether the limitation are satisfied. If so, processing proceeds to a step 670, where the current pre-recorded segment is played until the closest transition point bridging the current and the alternative segment extracted from the repository is reached (see FIG. 4 and the accompanying text for the illustration). After the step 670, processing proceeds to a step 672, where the alternative (found) pre-recorded segment is replayed, replacing the previous partially replayed segment. After the step 672, processing proceeds to the step 640, discussed above, which may be independently reached from the step 637 and the test step 645.

If it is determined at the test step 660 that the required segment is not found in the repository or if it is determined at the test step 665 that the timing and presentation flow limitations are not satisfied for the new replacement segment candidate extracted from the repository, processing proceeds to a test step 675, where it is determined whether the audience chooses to stop the asynchronous presentation. If so, processing is complete; otherwise, processing proceeds to a test step 680, where it is determined whether an immersive audience user (a watch party member) is joining the asynchronous presentation to replace the original presenter. If so, processing proceeds to a step 682, where the commenting immersive watch party (audience) member is selected. After the step 682, processing proceeds to a step 685, where the selected watch party member is immersed into the asynchronous presentation making the asynchronous presentation interactive by temporarily replacing the original asynchronous presenter for the presentation talk. After the step 685, processing proceeds to a step 690, where the immersive watch party member continues the presentation until the end of presentation of the current slide (note that the segment of presentation with an immersive watch party member may be recorded, stored in the searchable repository of presentation segments, and used in future asynchronous presentations under the adequate security provisions and permissions). Note that the step 690 may be independently reached from the test step 680 if it is determined that there is no immersive audience (watch party) member to join the asynchronous presentation.

After the step 690, processing proceeds to a test step 692, where it is determined whether the current slide is the last slide in the asynchronous (or hybrid in case immersive audience member(s) have been joining) presentation. If so, processing is complete; otherwise, processing proceeds to a step 695, where the next slide is selected. After the step 695, processing proceeds to the step 637, discussed above, which may be independently reached from the steps 635, 652.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations and functioning may vary from the illustrations presented herein. Further, various aspects of the system described herein may be deployed on various devices, including, but not limited to notebooks, smartphones, tablets, and other mobile computers. Smartphones and tablets may use operating system(s) selected from the group consisting of: IOS, Android OS, Windows Phone OS, Blackberry OS, and mobile versions of Linux OS. Notebooks and tablets may use operating system selected from the group consisting of Mac OS, Windows OS, Linux OS, Chrome OS.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of presenting a pre-recorded video presentation to an audience, comprising:
   creating a plurality of pre-recorded alternative video portions that correspond to portions of the pre-recorded video presentation, each of the alternative video portions having a different level of granularity of subject level detail than any other alternative video portion, at least some of the portions including transition points to facilitate transitioning between alternative video portions of different granularity;
   measuring audience feedback while presenting the pre-recorded video presentation;
   in response to the audience feedback indicating at least one of: discomfort, confusion or questioning of content of a current portion of the pre-recorded video presentation by members of the audience, determining availability of at least one of the pre-recorded alternative video portions to replace the current portion of the pre-recorded video presentation; and
   in response to the at least one of the pre-recorded alternative video portions that correspond to the current portion of the pre-recorded video presentation being available, replacing the current portion of the pre-recorded video presentation with the at least one of the pre-recorded alternative video portions by stopping the current portion of the pre-recorded video presentation and starting the at least one of the pre-recorded alternative video portions.

2. The method of claim 1, wherein the current portion of the pre-recorded video presentation is stopped at a transition point.

3. The method of claim 1, further comprising:
in response to the at least one of the pre-recorded alternative video portions not being available, prompting the members of the audience to select one of: stopping the pre-recorded video presentation, immersing at least one of the members of the audience in the pre-recorded video presentation, or continuing with the current portion of the pre-recorded video presentation.

4. The method of claim 3, wherein at least one of the members of the audience is immersed in the pre-recorded video presentation to provide a detailed explanation of the current portion of the pre-recorded video presentation.

5. The method of claim 4, wherein the at least one of the members of the audience that is immersed in the pre-recorded video presentation is recorded along with the current portion of the pre-recorded video presentation.

6. The method of claim 1, further comprising:
replacing a different one of the alternative video portions of the pre-recorded video presentation with an alternative video portion having less subject level detail to free up time for the at least one of the pre-recorded alternative video portions.

7. The method of claim 1, wherein following the at least one of the pre-recorded alternative video portions, the pre-recorded video presentation resumes at a location of the pre-recorded video presentation immediately following the at least one of the pre-recorded alternative video portions.

8. The method of claim 7, wherein resuming the pre-recorded video presentation depends upon at least one of: an amount of time remaining in the pre-recorded video presentation and an amount of time used for the at least one of the pre-recorded alternative video portions.

9. The method of claim 1, wherein the transition points are defined using time stamps.

10. The method of claim 1, wherein measuring audience feedback includes capturing verbal and non-verbal cues shown by members of the audience.

11. The method of claim 10, wherein the verbal and non-verbal cues include at least one of: gestures, facial expressions, gaze direction and trajectory, questions asked via chat, forms, applications, or other mechanisms, chat exchange between members of the audience, voice replicas, or physiological characteristics captured by wearable devices and sensors of the members of the audience.

12. The method of claim 11, wherein measuring audience feedback includes using at least one of: facial recognition, gesture recognition, voice recognition, speech recognition, eye tracking, natural language processing, or machine learning.

13. The method of claim 1, wherein at least some of the video portions show slides of the presentation.

14. The method of claim 13, wherein the different subject level detail includes a basic explanation of the at least one of the slides and a condensed summary of the at least one of the slides provided by bullet point text.

15. The method of claim 13, wherein the different subject level detail includes an explanation of at least one of: tables, diagrams, graphs, and accompanying text.

16. The method of claim 1, wherein the pre-recorded alternative video portions are provided in a repository and replacing the current portion of the pre-recorded video presentation with the at least one of the pre-recorded alternative video portions includes searching the repository for the alternative video portion.

17. The method of claim 1, wherein at least some members of the audience are watch party members that are immersed in a watch party space that is separate from a presentation space used for the pre-recorded video presentation and wherein the presentation space is overlaid upon the watch party space.

18. The method of claim 17, wherein at least one of the watch party members is also immersed in the presentation space and provides a detailed explanation of a slide in the presentation space.

19. The method of claim 18, wherein the at least one of the watch party members is recorded and added to a repository for future access.

20. A non-transitory computer readable medium containing software that presents a pre-recorded video presentation to an audience using a plurality of pre-recorded alternative video portions that correspond to portions of the pre-recorded video presentation, each of the alternative video portions having a different level of granularity of subject level detail than any other alternative video portion, at least some of the portions including transition points to facilitate transitioning between alternative video portions of different granularity, the software comprising:
executable code that measures audience feedback while presenting the pre-recorded video presentation;
executable code that determines availability of at least one of the pre-recorded alternative video portions to replace the current portion of the pre-recorded video presentation in response to the audience feedback indicating at least one of: discomfort, confusion or questioning of content of a current portion of the pre-recorded video presentation by members of the audience; and
executable code that replaces the current portion of the pre-recorded video presentation with the at least one of the pre-recorded alternative video portions by stopping the current portion of the pre-recorded video presentation and starting the at least one of the pre-recorded alternative video portions in response to the at least one of the pre-recorded alternative video portions that correspond to the current portion of the pre-recorded video presentation being available.

* * * * *